United States Patent [19]
Sikorra

[11] 3,729,985
[45] May 1, 1973

[54] STRAIN GAGE

[75] Inventor: Charles F. Sikorra, Seattle, Wash.
[73] Assignee: The Boeing Company, Seattle, Wash.
[22] Filed: Feb. 9, 1972
[21] Appl. No.: 224,725

[52] U.S. Cl..................73/88.5 R, 33/147 D, 336/30
[51] Int. Cl................................................G01b 7/10
[58] Field of Search .........................73/88 R, 88.5 R; 33/147 D, 148 D; 317/246

[56] References Cited

UNITED STATES PATENTS

| 2,085,687 | 6/1937 | Peters | 33/147 D |
| 2,189,775 | 2/1940 | Bleakney | 33/148 D X |
| 2,292,326 | 8/1942 | Lewis | 33/148 D |

FOREIGN PATENTS OR APPLICATIONS

| 743,325 | 12/1943 | Germany | 336/30 |

Primary Examiner—Charles A. Ruehl
Attorney—Thomas H. Murray et al.

[57] ABSTRACT

Strain gage apparatus of the type in which a pair of elements, connected at spaced points to a specimen under test, move relative to each other as the specimen is loaded to effect a change in an electrical signal indicative of the magnitude of the strain. Means are provided to maintain relative movement of the aforesaid elements the same and proportional to strain regardless of whether the strain occurs along the axis of the specimen or is due to bending. This is accomplished by inserting pivots or flexures in a specified geometrical pattern in the strain gage configuration to maintain the movable elements of the strain gage coaxial at all times regardless of whether the specimen is subjected to bending or axial loads.

10 Claims, 7 Drawing Figures

Patented May 1, 1973 3,729,985

STRAIN GAGE

BACKGROUND OF THE INVENTION

The present invention is particularly adapted for use in strain gages of the type in which a pair of relatively movable elements are connected at spaced points to a specimen under test such that relative movement between the elements will unbalance an electrical bridge or the like to induce an electrical signal indicative of the magnitude of the strain. For example, the strain gage may comprise a gage arm secured at one end to a specimen under test and carrying at its opposite end a capacitor ring. Surrounding this capacitor ring are two larger, concentric capacitor rings secured to the specimen under test and arranged such that the inner capacitor ring is adjacent equal portions of the two outer capacitor rings with a reference strain (which may be zero) induced in the specimen. It should be understood however, that under some conditions, the inner capacitor ring will be adjacent unequal portions of the two outer capacitor rings, either because an initial bias is desired, or because some initial mechanical unbalance in the gage can be tolerated.

With this arrangement, strain tending to move apart the connections of the gate to the specimen will cause the area of the inner capacitor ring adjacent one outer ring to increase while that adjacent the other outer ring decreases. By connecting the capacitor rings as a half-bridge in an electrical bridge configuration, and by exciting the bridge with an oscillatory voltage source, the bridge will become unbalanced due to movement of the inner capacitor ring to produce an output signal which varies as a function of the strain in the specimen.

A gage of this type can be used to determine axial strain in the specimen as well as bending strain in the specimen. In prior art gages of this type, however, the outer capacitor rings and the gate arm which carried the inner capacitor ring were ordinarily rigidly connected to the specimen. In axial loading, the specimen surface strain was effectively transferred at the same magnitude from the specimen through the supports to the strain sensing device. In bending, however, the strain transferred from the specimen surface to the sensor was magnified for the reason that the rigid supports would move through arcs due to the bending action and increase the displacement of the sensing elements over and above that due to the strain alone. As a result, the strain sensitivity of the gage was different for axial as compared to bending strain. The bending strain sensitivity is dependent on the thickness of the specimen and the distance of the axis of the capacitor rings from the specimen surface. Furthermore, when measuring bending strain, an angular change will occur between the axis of the inner capacitor ring and the outer capacitor ring. This is detrimental because it can limit the strain range and affect strain sensitivity.

SUMMARY OF THE INVENTION

In accordance with the present invention, a strain gage arrangement is provided which overcomes the disadvantages of prior art gages and provides a means whereby the output of the strain gage will be essentially the same regardless of whether the strain is due to axial forces or bending.

Specifically, the strain gage apparatus of the invention is of the type in which a gage arm is secured at one end to a point on the surface of a specimen to be tested and carries at its other end a first element which can move relative to an associated second element secured to the surface of the specimen at a point spaced from the first-mentioned point, whereby the displacement of the elements relative to each other is an indication of bending or tensile strains induced in the specimen between the aforesaid points. The invention resides in the improvement of means for pivotally connecting the end of the gage arm opposite the aforesaid first element to the specimen, means connecting the associated second element to the surface of the specimen, and means interconnecting the end of the gage arm which carries said first element and its associated second element to permit relative straight-line movement between the two regardless of whether an axial or bending strain is induced between the points at which the gage is connected to the specimen.

In the referred embodiment of the invention, the means permitting relative straight-line movement between the two associated elements comprises a parallelogram assembly comprised of four flexures or pivot points located in two parallel arms interconnecting one end of the gage arm and the aforesaid associated second element. As will be appreciated, the means pivotally connecting the various elements of the gage can comprise either a pivot (e.g., a hinge) or a flexure; and in the specification and claims which follow, the term "means pivotally connecting" encompasses both.

The above and other objects and features of the invention will become apparent from the following detailed description taken in connection with the accompanying drawinGs which form a part of this specification.

Figure 3:
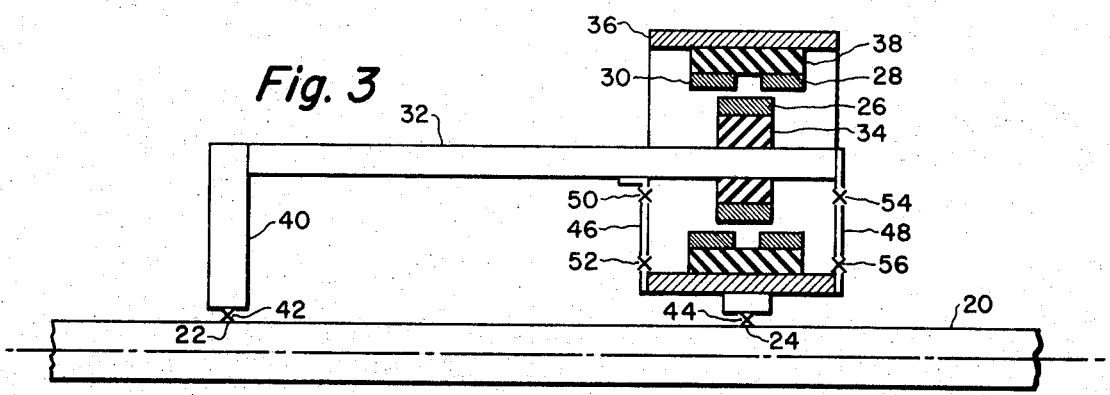
Figure 4:
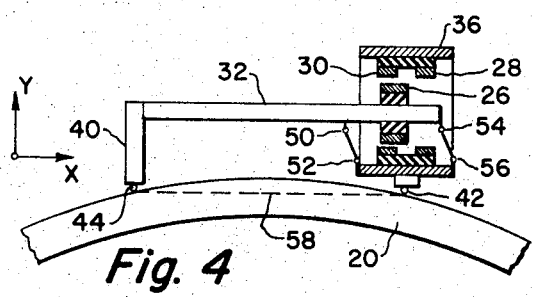
Figure 5:
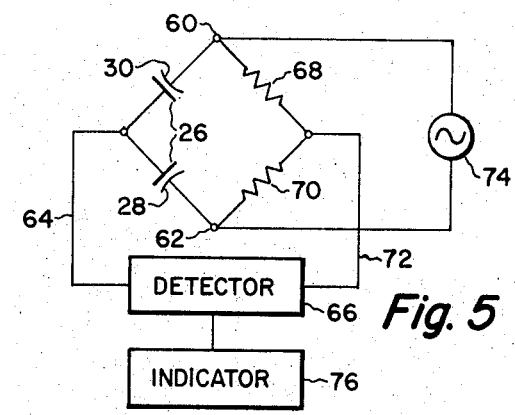
Figure 6:
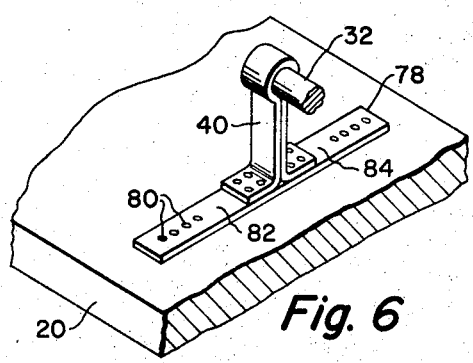
Figure 7:
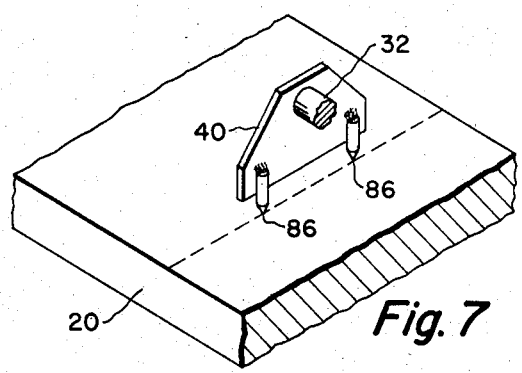

FIG. illustrates the improved gage construction of the invention;

FIG. 4 illustrates the effect of bending strain on the gage of the invention;

FIG. 5 is a schematic diagram of an electrical circuit which can be connected to the capacitor plates of the embodiment of the invention shown in FIG. 3 to indicate strain; and FIGS. 6 and 7 illustrate typical examples of pivots or flexures used in the gage construction of FIG. 3.

DESCRIPTION OF THE INVENTION

Figure 1:
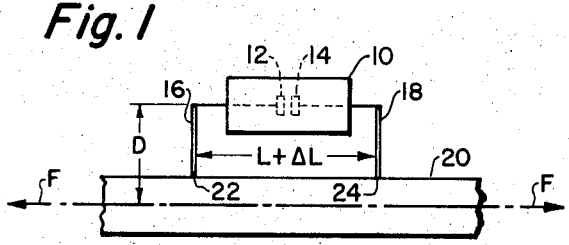
FIG. 1 is a schematic diagram of a typical strain gage in axial tension loading, showing the manner in which relatively movable elements of the gage can be used to determine strain.

With reference now to the drawings, and particularly to FIG. 1, a strain gage or sensor is schematically indicated by the reference numeral 10 and includes a pair of relatively movable elements 12 and 14 connected to arms 13 and 18 secured to a specimen 20 at points 22 and 24. Ordinarily, the arms 16 and 18 are rigidly secured to the specimen 20 at points 22 and 24 by welding, riveting or the like; and the elements 12 and 14 are rigidly connected to the arms 16 and 18. Assuming that an axial tensile force F is applied to the specimen 20, for example, the points 22 and 24 will tend to move apart, as will the arms 16 and 18. This, in turn, causes the elements 12 and 14 in the sensor 10 to move apart also. The elements 12 and 24 are connected to electrical circuitry, not shown in FIGS. 1 and 2, such that an increase or decrease in the spacing between the two will produce an electrical signal indicative of the change in spacing and, hence, the strain induced in the specimen 20. The elements 12 and 14, for example, may comprise relatively movable capacitor plates connected in a bridge configuration, hereinafter described in greater detail, or may comprise an inductive arrangement where an induction coil moves toward or away from a metallic element and produces an electrical signal which is a function of the spacing between the two, or any other motion or displacement sensor.

Figure 2:
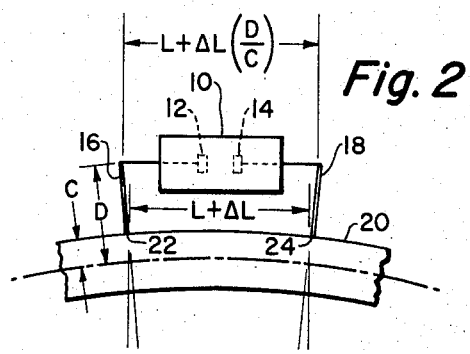
FIG. 2 is a schematic illustration of a device similar to that of FIG. 1, but showing the effect upon the gage under bending.

In the drawings of FIGS. 1 and 2, the letter L represents the unstrained length between the gage supports 16 and 18; while ΔL represents the change in length due to an axial tensile force being applied to the specimen 20. Strain is defined as ΔL/L. In FIG. 1, it can be seen that in axial loading, the specimen surface strain is effectively transferred at the same magnitude from the specimen through the supports 16 and 18 to the strain sensing device 10.

In bending, however, the strain transferred from the specimen surface to the sensor location is magnified. This is illustrated in FIG. 2 where elements corresponding to those of FIG. 1 are identified by like reference numerals. Note that in bending, the distance between points 22 and 24 is still L + ΔL; however the distance between the movable elements 12 and 14 increases due to the fact that the upper ends of the arms 16 and 18 move away from each other through arcs due to bending of the specimen 20. The magnification of strain due to the arcuate movement of the arms 16 and 18 is a function of the comparative distances of the sensor axis to the neutral-bending axis (distance D), to the specimen surface to neutral-bending axis (distance C). That is, the distance between the arms 16 and 18 is now L + Δ L (D/C) rather than L + Δ L for the case where axial tensile forces are applied. Hence, the resulting strain sensitivity of the gage is different for axial as compared to bending strains. The bending strain sensitivity is dependent on the thickness of the specimen and the distance (D) of the strain sensor axis to the specimen surface. As the ratio of distance D to distance C increases, so also does the error encountered in attempting to measure bending error. Additionally, in bending, an angular change can occur between the sensing elements 12 and 14 which is detrimental because it can limit strain range and affect strain sensitivity. This is particularly true where one element 12 or 14 is coaxial with and movable within another element which surrounds it.

The improved gage of the present invention is shown in FIg. 3. It consists of a capacitive sensor comprising a central, movable capacitor ring 26 and two larger concentric capacitor rings 28 and 30. The inner capacitor ring 26 is secured to one end of a gage arm 32 through insulating material 34. Similarly, the outer capacitor rings 28 and 30 are connected to an external support ring 36 through insulation 38. The gage arm 32 is rigidly connected at its end opposite the capacitor ring 26 to an arm 40. The arm 40, as shown, is connected to point 22 on the specimen 20 through a pivot or flexure, schematically illustrated at 42. Similarly, the outer support ring 36 is connected to point 24 on the surface of the specimen 20 through a second pivot or flexure, schematically illustrated at 44.

The end of the gate arm 32 which carries the inner capacitor ring 26 is connected through arms 46 and 48 to the supporting ring 36. The arm 46 incorporates at its upper and lower ends pivots or flexures schematically indicated at 50 and 52. Similarly, the arm 48 incorporates at its upper and lower ends corresponding pivots or flexures schematically indicated at 54 and 56. Since the pivots in the respective arms are directly opposite each other, it will be readily appreciated that the arms 46 and 48 incorporating the four flexures or pivots comprises a parallelogram arrangement with permits movement of the inner capacitor ring 26 with respect to the outer rings 28 and 30 upon relative movement of the points 22 and 24 in response to strain in the specimen 20. With the arrangement shown, the movable capacitor ring 26 will always move axially and parallel to the fixed capacitor rings 28 and 30. The length of arm 40, the arms 46 and 48 and the other parts of the gage are such that the axis of the gage arm 32 will be parallel to the specimen surface with no strain induced. Additionally, on installation, the two arms 46 and 48 are substantially perpendicular to the gage arm 32.

In operation, an axial load on the specimen 20 will cause an axial surface displacement between points 22 and 24; and this displacement will be transferred to the capacitor rings for strain measurement in a manner hereinafter described. However, when the specimen is subjected to bending as shown in FIG. 4, a surface displacement will occur between points 22 and 24; while an angular change will occur relative to these two points. Due to the flexures 42 and 44, the arm 40 and the support ring 36 will remain in upright positions along the Y-axis. However, as the points 22 and 24 move apart under the strain induced in the specimen 20, the inner capacitor ring 26 will move relative to the outer rings 28 and 30, this movement being facilitated by virtue of the parallelogram arrangement of legs 46 and 48. Note that the distance between the axis of arm 32 and a chord 58 drawn between points 22 and 24 does not change substantially. The relative displacement of points 22 and 24 in the X-direction as viewed in FIG. 4 will be transferred to the capacitor sensor.

One electrical circuit to which the capacitor rings can be connected to derive an electrical signal which is a function of strain is shown in FIG. 5. The outer capacitor rings 28 and 30 are connected to points 60 and 62 in a bridge configuration while the capacitor ring 26 is connected through lead 64 to one input of a detector or rectifier 66. The points 60 and 62, in turn, are connected through resistors 68 and 70 and lead 72 to the other input of the detector 66. Points 60 and 62 are energized by a source of alternating current voltage 74.

With the inner capacitor ring 26 intermediate the rings 28 and 30 such that equal portions of the rings 28 and 30 will be adjacent the ring 26, then the capacitive elements in the bridge of FIG. 5 will be equal. Assuming that the resistances of resistors 68 and 70 are equal, and that the impedances of the capacitive elements are equal, then under these circumstances, no output will appear across leads 64 and 72. However, should the inner capacitor ring 26 move to a point where the equal relationship with rings 28 and 30 no longer exists, then the capacitance in one of the legs of the bridge of FIG. 5 will increase while the other will decrease. Hence, the bridge will become unbalanced and an output will appear across leadS 64 and 72. This output, when rectified in detector 66, will produce an output whIch is a function of the amount of movement between the inner and outer capacitor rings. This output can then be applied to an indicator 76 which directly indicates strain.

Various types of pivots or flexures can be used in accordance with the invention. Typical supports are shown in FIGS. 6 and 7. In FIG. 6, gage arm 32 is affixed to the arm 40 which, in turn, is spot-welded to the mid-portion or median portion of a metal ribbon 78. The metal ribbon 78 is spot-welded by spot welds 80 at its opposite ends to the specimen 20. However, areas 82 and 84 exist between the spot welds 80 and the arm 40 which permit the ribbon to flex upon application of an axial force thereto.

In FIG. 7, another embodiment of the invention is shown wherein the arm 40 is provided at its lower end with pointed contacts 86 recessed in holes provided in the surface of the specimen 20. With this arrangement, the pivot points will permit the arm 40 to pivot about the specimen; but will prevent movement of the arm 40 along the axis of the specimen.

Although the invention has been shown in connectiOn with certain specific embodiments, it will be readily apparent to those skilled in the art that various changes in form and arrangement of parts may be made to suit requirements without departing from the spirit and scope of the invention.

I claim as my invention:

1. In strain gage apparatus of the type in which a gage arm is secured at one end to a point on the surface of a specimen to be tested and carries at its other end a first element which can move relative to an associated second element secured to the surface of the specimen at a point spaced from said first-mentioned point whereby the displacement of the first and second elements relative to each other is an indication of bending or tensile strains induced in the specimen between said points; the improvement of:

means pivotally connecting said one end of the gage arm to the specimen, means pivotally connecting said associated second element to the surface of said specimen, and means interconnecting said other end of the gage arm to said associated second element to permit relative straight-line movement between the two regardless of whether an axial or bending strain is induced between said points.

2. The improvement of claim 1 wherein said means interconnecting said other end of the gage arm to said associated second element comprises a pair of parallel arms connected at their opposite ends through pivot means to the respective elements to provide a parallelogram arrangement.

3. The improvement of claim 1 wherein said first and second elements comprise concentric capacitor rings.

4. The improvement of claim 1 wherein the pivotal connecting means comprises a flexure consisting of a ribbon of metal secured at its opposite ends to the surface of said specimen and secured at its median portion to one of said elements.

5. The improvement of claim 4 wherein said ribbon of metal extends perpendicular to the axis of said gage arm.

6. The improvement of claim 1 including electrical circuitry connected to at least one of said first and second elements for producing an electrical signal indicative of strain induced in said specimen.

7. The improvement of claim 1 wherein said first element comprises a first capacitor ring carried on said other end of the gage arm, said second element comprising at least one of two capacitor rings surrounding said first capacitor ring, an external support ring which carries on its inner periphery said two capacitor rings, a flexure connecting a point on the outer periphery of said support ring to said specimen, and a parallelogram assembly connecting said support ring to said other end of the gage arm.

8. The improvement of claim 7 wherein said parallelogram assembly comprises a pair of parallel arms connected at their opposite ends through flexures to said other end of the gage arm and said support ring respectively.

9. The improvement of claim 8 wherein one of said parallel arms extends from an edge of said support ring to said other end of the gage arm on one side of the first capacitor ring, the other of the parallel arms being coplanar with the first and extending from the other edge of the support ring to said other end of the gage arm on the other side of the first capacitor ring, said flexures at the opposite ends of said parallel arms providing axes of rotation parallel to the axis of rotation provided by the flexure which connects said support ring to said specimen.

10. The improvement of claim 9 wherein said one end of the gage arm is connected to said specimen through a flexure which provides an axis of rotation which is parallel to those provided by the other-named flexures.

* * * * *